United States Patent
Zhang et al.

(10) Patent No.: US 10,386,259 B2
(45) Date of Patent: Aug. 20, 2019

(54) HAZGAS SYSTEM WITH ACOUSTIC WAVE SENSORS

(71) Applicant: General Electric Company, Schenectady, NY (US)

(72) Inventors: Hua Zhang, Greenville, SC (US); Manuel Cardenas, Jr., Greenville, SC (US); David Trayhan, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 72 days.

(21) Appl. No.: 15/246,720

(22) Filed: Aug. 25, 2016

(65) Prior Publication Data
US 2018/0058972 A1 Mar. 1, 2018

(51) Int. Cl.
*F02C 3/04* (2006.01)
*F02C 9/00* (2006.01)
*G01M 3/02* (2006.01)
*G01M 15/14* (2006.01)

(52) U.S. Cl.
CPC ............... *G01M 3/025* (2013.01); *F02C 3/04* (2013.01); *F02C 9/00* (2013.01); *G01M 15/14* (2013.01); *Y02E 20/16* (2013.01)

(58) Field of Classification Search
CPC .............. G01M 3/025; F02C 3/04; F02C 9/00
See application file for complete search history.

(56) References Cited

U.S. PATENT DOCUMENTS

| 5,861,546 A | * | 1/1999 | Sagi ........................ G01F 1/44 137/599.13 |
| 2007/0028669 A1 | * | 2/2007 | Brewster ................. F04B 37/14 73/31.03 |
| 2012/0276387 A1 | * | 11/2012 | Hattanda ................ B22D 41/54 428/402 |
| 2013/0005237 A1 | * | 1/2013 | Baten ....................... F02C 3/32 454/252 |
| 2014/0165530 A1 | | 6/2014 | Stutz et al. |

(Continued)

OTHER PUBLICATIONS

C. Massie, G. Stewart, G. McGregor, J.R. Gilchrist; Design of a portable optical sensor for methane gas detection; Sensors and Actuators B; Published online May 23, 2005 by Science Direct.*

(Continued)

*Primary Examiner* — Justin Seo
*Assistant Examiner* — John M Royston
(74) *Attorney, Agent, or Firm* — Fletcher Yoder, P.C.

(57) ABSTRACT

A gas monitoring system for monitoring gas leaks from a gas turbine engine disposed within a gas turbine enclosure includes a controller including a processor and a memory communicatively coupled to the processor. The memory stores instructions which when executed by the processor perform operations including obtaining one or more operational parameters associated with a gas turbine system having the gas turbine engine from one or more sensors during operation of the gas turbine engine. The operations also include utilizing a gas leakage monitoring model to monitor for gas leaks within the gas turbine enclosure and to generate a gas index indicative of a severity of a gas leak within the gas turbine enclosure based on the one or more operational parameters. The operations further include outputting the index.

19 Claims, 6 Drawing Sheets

(56) References Cited

U.S. PATENT DOCUMENTS

| | | | | |
|---|---|---|---|---|
| 2015/0007574 A1* | 1/2015 | Morgan | ............... | F02C 9/28 |
| | | | | 60/772 |
| 2015/0226129 A1 | 8/2015 | Byrd et al. | | |
| 2015/0308915 A1 | 10/2015 | Konatham et al. | | |
| 2016/0216172 A1* | 7/2016 | Rella | ............ | G01N 33/0009 |

OTHER PUBLICATIONS

Gabor J. Tamasy, (1997),"Smart sensor networks for robotic sensor skins", Sensor Review, vol. 17 Iss 3 pp. 232-239, Permanent link to this document: http://dx.doi.org/10.1108/02602289710172364.

Xiao Liu et al., A Survey on Gas Sensing Technology, Sensors 2012, 12, 9635-9665; www.mdpi.com/journal/sensors.

Krogerus, T. R., et al., "A Survey of Analysis, Modeling, and Diagnostics of Diesel Fuel Injection Systems," ASME, Journal of Engineering for Gas Turbines and Power, vol. 138, Issue 8, pp. 1-11 (Feb. 23, 2016) (Abstract).

\* cited by examiner

HAZGAS SYSTEM WITH ACOUSTIC WAVE SENSORS

BACKGROUND

The present disclosure relates generally to gas turbines. In particular, the present disclosure relates to systems for gas leak detection in a turbine enclosure.

Gas turbines are used to generate power for various applications. To protect the turbine from the surrounding environment and vise versa, the gas turbine may be housed or enclosed in an enclosure with appropriate inlets, exhaust outlets, and ventilations, etc. For example, a gas turbine may be housed inside an enclosure, which may facilitate reducing noise during turbine operation and contain environmental hazards such as fuel gas from leaking to the surrounding environment. While sensors may be installed to monitor the general health of the fuel and piping systems and detect major fuel leaks, it is difficult to detect minor leaks. The minor leaks may go unnoticed and result in decreased productivity and reliability of the turbine system.

BRIEF DESCRIPTION

Certain embodiments commensurate in scope with the originally claimed subject matter are summarized below. These embodiments are not intended to limit the scope of the claimed embodiments, but rather these embodiments are intended only to provide a brief summary of possible forms of the subject matter. Indeed, the presently claimed embodiments may encompass a variety of forms that may be similar to or different from the embodiments set forth below.

In a first embodiment, a gas monitoring system for monitoring gas leaks from a gas turbine engine disposed within a gas turbine enclosure includes a controller including a processor and a memory communicatively coupled to the processor. The memory stores instructions which when executed by the processor perform operations including obtaining one or more operational parameters associated with a gas turbine system having the gas turbine engine from one or more sensors during operation of the gas turbine engine. The operations also include utilizing a gas leakage monitoring model to monitor for gas leaks within the gas turbine enclosure and to generate a gas index indicative of a severity of a gas leak within the gas turbine enclosure based on the one or more operational parameters. The operations further include outputting the index.

In a second embodiment, a system includes a gas turbine enclosure, a gas turbine engine disposed in the gas turbine enclosure, and one or more sensors disposed within the turbine enclosure. The system also includes a controller including a processor and a memory communicatively coupled to the processor. The memory stores instructions which when executed by the processor perform operations including obtaining one or more operational parameters associated with a gas turbine system having the gas turbine engine from the one or more sensors during operation of the gas turbine engine. The operations also include utilizing a gas leakage monitoring model to monitor for gas leaks within the gas turbine enclosure and to generate a gas index indicative of a severity of a gas leak within the gas turbine enclosure based on the one or more operational parameters. The operations further include outputting the index.

In a third embodiment, a non-transitory computer-readable medium having computer executable code stored thereon. The code includes instructions for obtaining one or more operational parameters associated with a gas turbine system having a gas turbine engine disposed within a gas turbine enclosure from one or more sensors during operation of the gas turbine engine. The code also includes utilizing a gas leakage monitoring model to monitor for gas leaks within the gas turbine enclosure and to generate a gas index indicative of a severity of a gas leak within the gas turbine enclosure based on the one or more operational parameters. The code further includes outputting the index.

BRIEF DESCRIPTION OF THE DRAWINGS

These and other features, aspects, and advantages of the presently disclosed techniques will become better understood when the following detailed description is read with reference to the accompanying drawings in which like characters represent like parts throughout the drawings, wherein.

DETAILED DESCRIPTION

Figure 1:
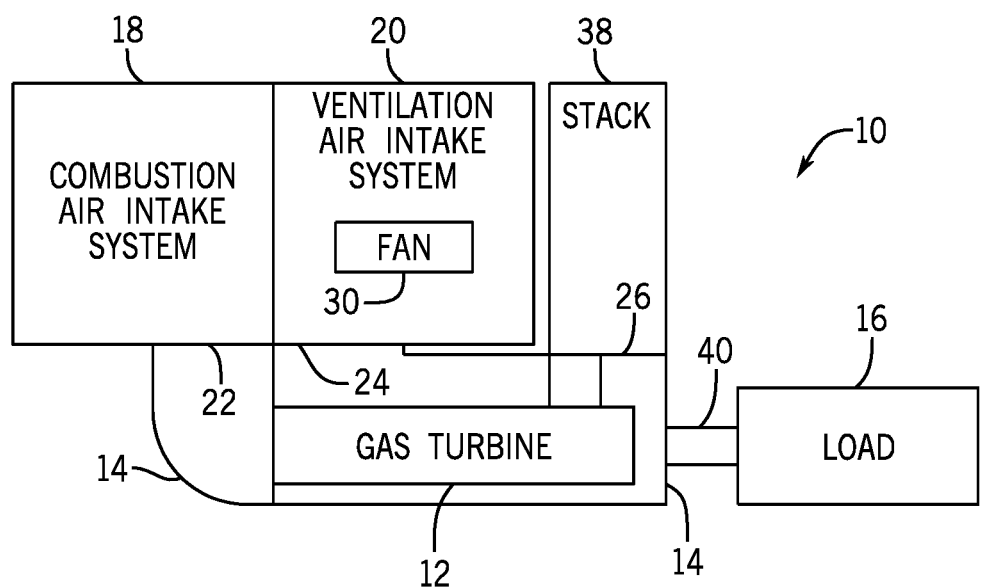
FIG. 1 is a partial schematic illustration of a turbine system having a gas turbine in a gas turbine enclosure, in accordance with an embodiment.

One or more specific embodiments of the presently disclosed embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the presently disclosed embodiments, the articles "a," "an," "the," and "said" are intended to mean that there are one or more of the elements. The terms "comprising," "including," and "having" are intended to be inclusive and mean that there may be additional elements other than the listed elements.

As described below, a model (e.g., model for active gas leakage or gas presence monitoring) may be developed to provide system assessment of gas (e.g., hazardous gas, combustible gas, fuel gas) leakage situation or the presence of gas outside the gas turbine, and report trends that may require maintenance/repair action and issue system advises on start. It may be appreciated that although the illustrated embodiments below discuss a model for assessing hazardous gas leakage situation, the model may be used in detecting any gas(es) (unwanted or undesired gases) from any source (s), not limited to a hazardous gas leak. For example, the model may be used for monitoring any undesirable presence (s) of gas(es) due to leakage(s) of the gas turbine system within or outside the enclosure or due to malfunction or failure of machine component(s) or system(s) of the gas turbine system. The model for active hazardous gas (or "hazgas") monitoring may be connected to a service platform (e.g., cloud computing service, distributed control system, etc.) to generate diagnostic/assessment reports, maintenance and repair recommendations, and operation adjustments periodically. The model may be developed and updated based on lay out information of piping and equipment inside the enclosure, operational parameters/conditions collected during operation of the turbine system, including but not limited to leakage or hazgas concentration (e.g., concentration of combustible gas, partial pressure of the liquid fuel vapor), leaking rate, leakage volume, leakage size, leakage location, and severity of the leakage, and various operation data of the fuel and power generation systems (enclosure air pressure and temperature, enclosure ventilation fan flow rate and fan curves, fuel gas pressure and temperature, fuel gas flow rate, turbine power output and efficiency, compressor fuel flow rate, discharge temperature and pressure, gas turbine exhaust temperature, etc.).

A correlation function may be established between hazgas concentration and leakage size, and such correlation may be used to assess the severity of the leakage (e.g., minor leaks, major leaks). Herein the leakage size is defined as leakage volume in combination with hazgas concentration, and the leakage size is related to how much is leaked from fuel gas piping inside the enclosure for example. More specifically, the leakage size refers to volume with hazgas concentration level that falls between the lower explosive limit (LEL) and the upper explosive limit (UEL) (e.g., the amount of gas between the two limits are explosive). A combustion may ignite only with a large enough ignitable size leakage pocket (e.g., a volume contains a specific range of flammable hazgas and oxygen mixture). It should be also noted that each gas has its own LEL and UEL (e.g., gas specific), and the hazgas concentration discussed herein is defined by percentage (%) of total volume with respect to the balance air. For example, a methane (e.g., $CH_4$) gas may have an approximately 5% of volume fraction in air (e.g., LEL) and an approximately 15% of volume fraction (e.g., UEL), while a methanol gas ($CH_3OH$) may have an approximately 6% of volume fraction for LEL and an approximately 36% of volume fraction for UEL.

The leakage size may refer to hazgas leakage from any components of the gas turbine system within the enclosure. When the leakage size is large, it may be relatively easier to detect since the hazgas concentration is high due to the large amount of hazgas in the enclosure. However, if the leakage size is small, the hazgas concentration is low due to ventilation flow of the enclosure, and such low concentration may not be easily detectable. For example, if the smallest detectable hazgas concentration is about 5% LEL (e.g., the $CH_4$ is about 0.25% volume fraction of air), a minor leak (e.g., level or severity of leak) is referred as the leakage that may not be detectable (e.g., less than 5% LEL). In one embodiment, in order to increase the range of the detectable hazgas concentration, an acoustic wave sensor capable of detecting partial pressure of liquid fuel vapor may be utilized to enable detecting minor leaks with hazgas concentration less than 1% LEL. In one embodiment, a hazgas monitoring system for monitoring hazgas leaks from a gas turbine engine disposed within a gas turbine enclosure includes a controller comprising a processor and a memory communicatively coupled to the processor. The memory stores instructions which when executed by the processor perform operations including obtaining one or more operational parameters associated with a gas turbine system having the gas turbine engine from one or more sensors during operation of the gas turbine engine. The operations also include utilizing a hazardous gas leakage monitoring model to monitor for hazardous gas leaks within the gas turbine enclosure and to generate a hazardous gas index indicative of a severity of a hazardous gas leak within the gas turbine enclosure based on the one or more operational parameters. The operations further include outputting the index. As such, the active hazgas monitoring model with ability to self-diagnostics may be integrated into digital power plant to improve the power generation reliability and availability, and contribute to operation optimization and asset optimization.

FIG. 1 is a partial schematic of an embodiment of a turbine system 10, enclosed or housed by a turbine enclosure 14 (e.g., gas turbine enclosure). The turbine system 10 may be a stationary or mobile gas turbine power generation unit. For example, the turbine system 10 may be a stationary unit disposed in a power plant, such as integrated gasification combined cycle (IGCC) power plant, or a simple cycle power plant. For example, the turbine system 10 may be a mobile unit carried by a trailer. The turbine system 10 includes a gas turbine or gas turbine engine 12, the enclosure 14 (e.g., gas turbine enclosure) that houses the gas turbine 12, and a load 16 (e.g., generator, electrical generator) driven by the gas turbine 12. The turbine system 10 also includes a combustion air intake system 18 upstream from the gas turbine 12, and a ventilation air intake system 20. The gas turbine enclosure 14 may define a first intake port 22 (e.g., first air intake port or turbine air intake), a second intake port 24 (e.g., second air intake port or enclosure ventilation intake), and an air exit port 26.

The first intake port 22 is coupled to the combustion air intake system 18 upstream from the gas turbine 12. The combustion air intake system 18 may include one or more filters to filter air provided to the gas turbine 12. The first intake port 22 directs air into the gas turbine 12. For example, the first intake port 22 may direct air into a compressor of the gas turbine 12. For example, the gas turbine 12 may compress the air from port 22, mix the air with fuel, and combust the air-fuel mixture to drive one or more turbines. The second intake port 24 is coupled to the ventilation air intake system 20. The ventilation air intake system 20 may include one or more filters to filter air provided to the enclosure 14 of the gas turbine 12. The ventilation air intake system 20 may provide air into the enclosure 14 via one or more fans 30. The second intake port 24 directs air into the enclosure 14 surrounding the gas turbine 12 to ventilate the enclosure. The exit port 26 is coupled to an exhaust stack 38 for venting exhaust gases from the gas turbine 12 and air (e.g., ventilation air) from the enclosure 14. The gas turbine 12 includes a shaft 40 that extends through the enclosure 14 and couples to the load 16. It may be appreciated that the components (e.g., components enclosed inside the enclosure 14) and any other relevant portions of the turbine system 10 may be coupled to a smart hazgas system for detecting, monitoring, and assessing the fuel leakage situation as will be discussed in FIG. 3.

Figure 2:
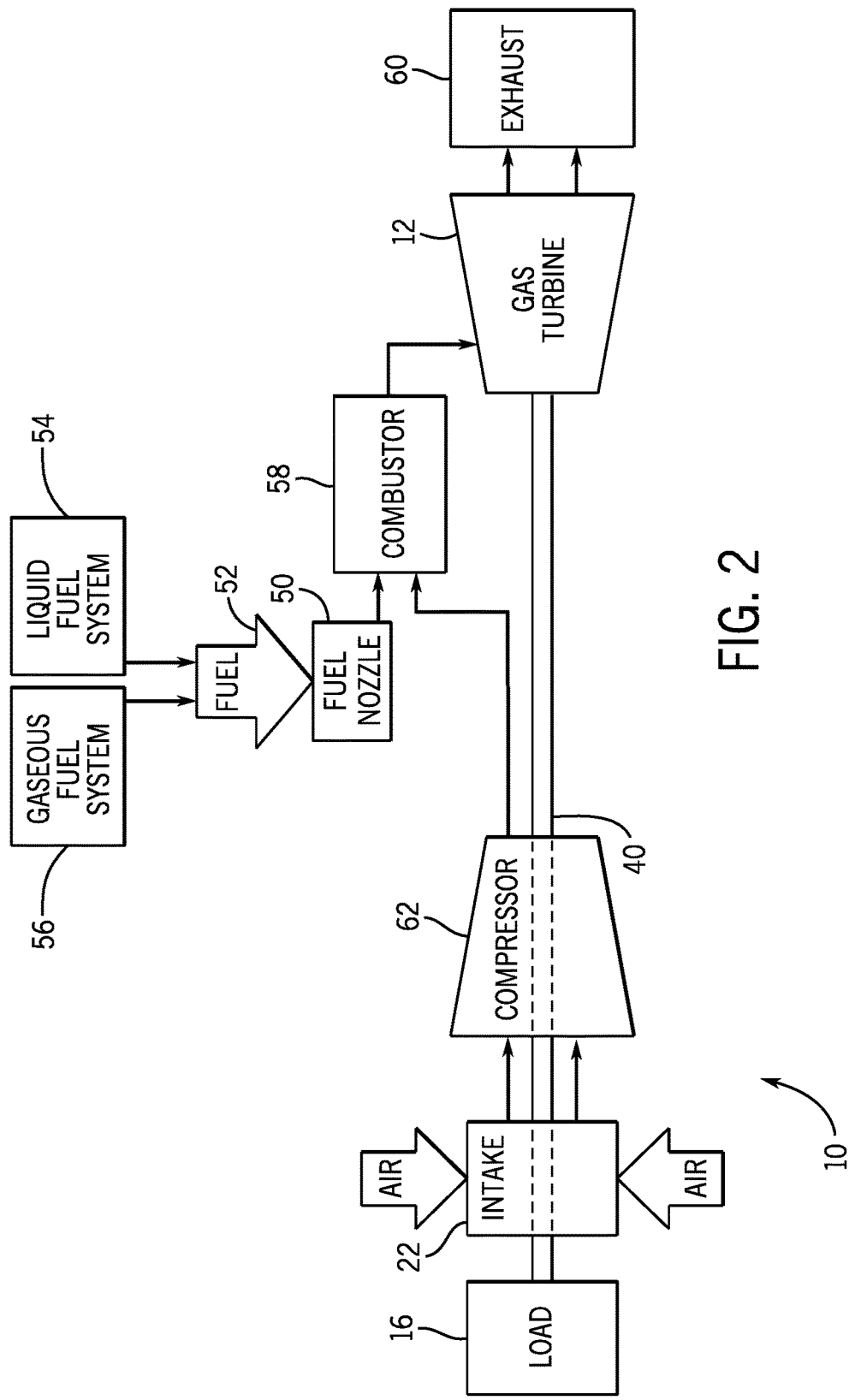
FIG. 2 is a schematic illustration of the turbine system, in accordance with an embodiment of the present disclosure.

FIG. 2 is a schematic of an embodiment of the turbine system 10, illustrating power generation of the gas turbine 12. The turbine system (e.g., gas turbine system, dual-fuel turbine system) 10 may use liquid or gas fuel, such as natural gas and/or a hydrogen rich synthetic gas, to drive the turbine system 10. As depicted, fuel nozzles 50 (e.g., multi-tube fuel nozzles) intake a fuel supply 52 from a liquid fuel system 54 or a gaseous fuel system 56, mix the fuel with an oxidant, such as air, oxygen, oxygen-enriched air, oxygen reduced air, or any combination thereof. Although the following discussion refers to the oxidant as the air, any suitable oxidant may be used with the disclosed embodiments. Once the fuel and air have been mixed, the fuel nozzles 50 distribute the fuel-air mixture into a plurality of combustors 58 in a suitable ratio for optimal combustion, emissions, fuel consumption, and power output. The turbine system 10 may include one or more fuel nozzles 50 located inside the plurality of combustors 58. The fuel-air mixture combusts in a chamber within each of the plurality of combustors 58, thereby creating hot pressurized exhaust gases. The plurality of combustors 58 direct the exhaust gases through the gas turbine 12 toward an exhaust outlet 60 (e.g. directed to the exit port 26). As the exhaust gases pass through the gas turbine 12, the gases force turbine blades to rotate the drive shaft 40 along an axis of the turbine system 10. As illustrated, the shaft 40 may be connected to various components of the turbine system 10, including a compressor 62. The compressor 62 also includes blades coupled to the shaft 40. As the shaft 40 rotates, the blades within the compressor 62 also rotate, thereby compressing air from the turbine air intake 22 through the compressor 62 and into the fuel nozzles 50 and/or the plurality of combustors 58. The shaft 40 may also be connected to the load 16, which may be a vehicle or a stationary load, such as an electrical generator in a power plant or a propeller on an aircraft, for example. The load 16 may include any suitable device capable of being powered by the rotational output of the turbine system 10. The fuel nozzle 52 may contain or connect with an end cover having fuel plenums, which may improve fuel distribution by feeding fuel directly into fuel injectors, which may feed fuel into tubes where it premixes with air before being released to the plurality of combustors 58. It may be appreciated that the components (e.g., components enclosed inside the enclosure 14) and any other relevant portions of the turbine system 10 may be coupled to a smart hazgas system for detecting, monitoring, and assessing the fuel leakage situation as will be discussed in FIG. 3.

Figure 3:
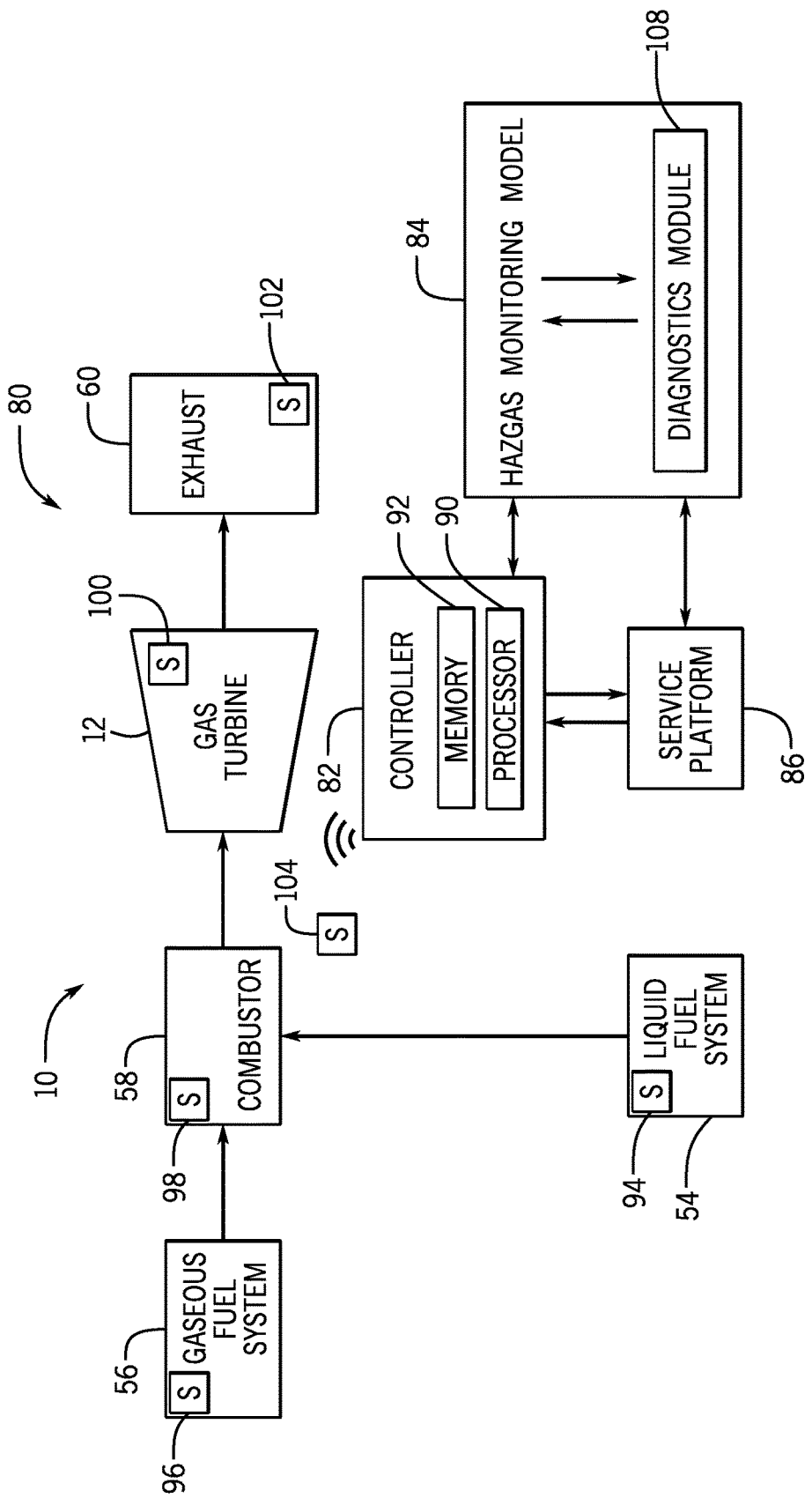
FIG. 3 is a block diagram illustrating a hazgas system for detecting and assessing the fuel leakage situation of the turbine system, in accordance with an embodiment of the present disclosure.

FIG. 3 is a block diagram illustrating a smart hazgas system 80 for detecting and assessing the fuel leakage situation of the turbine system 10. The smart hazgas system 80 may include a controller 82, a hazgas monitoring model 84, and a service platform 86 (e.g., cloud computing service, distributed control system). The controller 82 is communicatively coupled (e.g., data transfer, receiving and giving instructions) with the service platform 86, the hazgas monitoring model 84, and various components and systems of the turbine system 10 (e.g., gaseous fuel system 56 and liquid fuel system 54) via wired or wireless network or communication system. In some embodiments, the controller 82 may be part of the service platform 86 (e.g., cloud computer service, distributed control system, etc.). The controller 82 has a processor 90 and a memory 92 (e.g., a non-transitory computer-readable medium/memory circuitry) communicatively coupled to the processor 90, storing one or more sets of instructions (e.g., processor-executable instructions) implemented to perform operations related to the gas turbine system 10 (e.g., various components and systems of the turbine system 10). More specifically, the memory 92 may include volatile memory, such as random access memory (RAM), and/or non-volatile memory, such as read-only memory (ROM), optical drives, hard disc drives, or solid-state drives. Additionally, the processor 90 may include one or more application specific integrated circuits (ASICs), one or more field programmable gate arrays (FPGAs), one or more general purpose processors, or any combination thereof. Furthermore, the term processor is not limited to just those integrated circuits referred to in the art as processors, but broadly refers to computers, processors, microcontrollers, microcomputers, programmable logic controllers, application specific integrated circuits, and other programmable circuits.

For example, the memory 92 may store lay out information of fuel piping and components inside the enclosure 14. For example, the memory 92 may store information inputted by operators or users (e.g., via the controller 82 and/or via the service platform 86). For example, the memory 92 may store instructions as to obtain information (e.g., operational parameters and operational conditions) from various components and systems of the turbine system 10 and the smart hazgas system 80, and store the obtained information in the memory 92. The information may be collected via sensors disposed within the enclosure 14 (e.g., on any components shown in FIG. 1) and/or disposed on components of the gas turbine system 10 (e.g., on any components shown in FIG. 2). For example, these sensors may include one or more sensors 94 of the liquid fuel system 54, one or more sensors 96 of the gaseous fuel system 56, one or more sensors 98 of the plurality of combustors 58, one or more sensors 100 of the gas turbine 12, one or more sensors 102 of the exhaust 60, and one or more sensor 104 disposed within the turbine enclosure 14. The one or more sensors 94, 96, 98, 100, 102, and 104 may include, but are not limited to temperature sensors (e.g., thermocouples, resistance temperature detectors or RTDs, and surface acoustic wave sensors or SAWs), pressure sensors (e.g., pressure transducers, pressure transmitters, piezometers, pressure indicators, and manometers), gas sensors (e.g., microstructured gas sensors, infrared point sensors, infrared cameras, ultrasonic sensors, electrochemical gas sensors, semiconductor sensors, electrochemical sensors, and calorimetric gas sensors, SAWs), flow sensors (e.g., flow meters, thermal mass flow meters, and ultrasonic flow meter), accelerometers (e.g., high temperature accelerometers), speed sensors (e.g., turbine speed sensors and magnetic speed sensors), position sensors, electrical current sensors, voltage sensors, and timers.

The one or more sensors 94, 96, 98, 100, 102, and 104 are coupled to the controller 82 to obtain the information (e.g., operational parameters and operational conditions) to be fed into the hazgas monitoring model 84. For example, the information may include, but not limited to enclosure air pressure and temperature, enclosure ventilation fan flow rate and fan curves, hazgas concentration (e.g., % LEL), fuel gas pressure and temperature, partial pressure of the liquid fuel vapor, leakage volume, leaking rate, leakage size, leakage location, fuel gas flow rate, turbine power output and efficiency, compressor air flow rate, discharge temperature and pressure, and gas turbine exhaust temperature, etc. It may be appreciated that any of the parameters disclosed above may be determined based on time weighted average data. Furthermore, the one more sensors 104 disposed within the enclosure 14 may include at least one acoustic wave sensor or surface acoustic wave sensor (SAW), which is capable of detecting a large range of gases on a single sensor with resolution down to parts per trillion. Herein, the SAW may be especially utilized in the smart hazgas system 80 for detecting the partial pressure of liquid fuel vapor. As such, the smart hazgas system 80 may detect and assess the fuel leakage situation of the turbine system 10 even when the leakage level is minor (e.g., low leakage concentration detected as fuel vapor less than 1% LEL) and is not yet significant enough to trip/shut down the gas turbine 12 and/or turn off the fuel supply (e.g., the gaseous fuel system 56 and/or the liquid fuel system 54).

Figure 4:
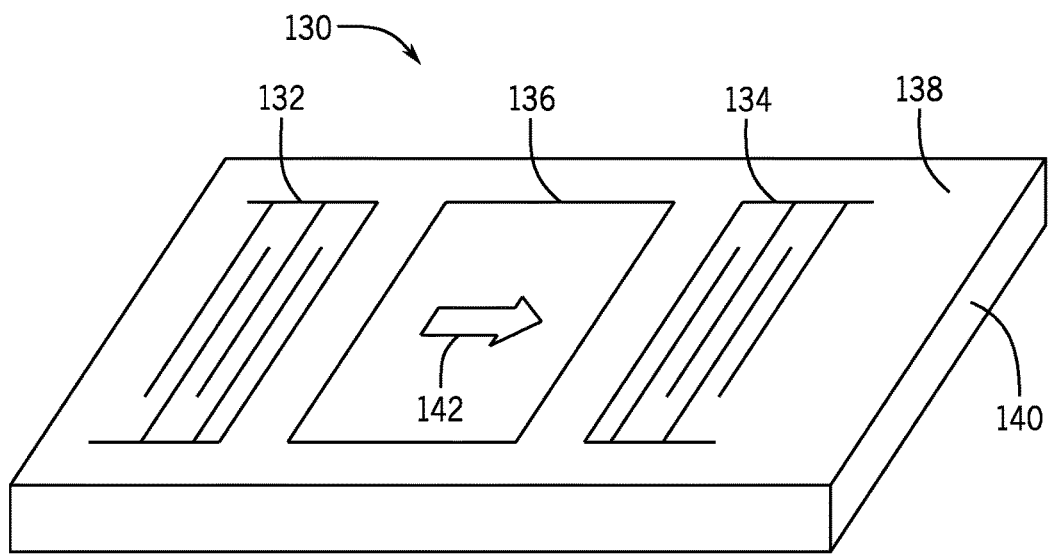
FIG. 4 is a perspective view of an acoustic wave sensor for detecting minor leaks especially with liquid fuel vapor detection, in accordance with an embodiment of the present disclosure.

With this in mind, FIG. 4 shows a perspective view of a SAW 130 for detecting minor leaks especially with liquid fuel vapor detection. The SAW 130 may include an input transducer 132, an output transducer 134, and a sensing film 136 placed on a surface 138 of a piezoelectric substrate 140. The transducers 132 and 134 may convert an incoming signal into a mechanical wave signal through the piezoelectric substrate 140. For example, the input and output transducers 132 and 134 are used to launch and receive a propagating acoustic surface wave (e.g., as indicated by an arrow 142), respectively. The sensing film 136 may be a gas specific sensing film, which may be metal, metal oxide, metal nitride, polymer, or biological materials (e.g., antigens, bacterial biofilms, or cell cultures). When the sensing film 136 is exposed to a gas, mechanical and electrical perturbations in the sensing film 136 may cause corresponding changes in characteristics (e.g., path, oscillation, frequency, velocity, amplitude, and phase characteristics) of the acoustic wave traveling (e.g., as indicated by the arrow 142). These changes in characteristics of the acoustic wave are translated into digital signal (e.g., using the output transducer 134), monitored, and analyzed for detecting the corresponding physical differences being measured.

Back to the discussion on FIG. 3, the hazgas monitoring model 84 is communicatively coupled with the controller 82 to output an action associated with the turbine system 10. The hazgas monitoring model 84 may predict the leakage situation (e.g., leakage concentration, rate, size, volume, location, and/or severity), make recommendations for maintenance and repair of components of the turbine system 10, and adjust an operation of one or more components of the turbine system 10. Furthermore, the hazgas monitoring model 84 may include expert experiences, analytical models, computational fluid dynamics (CFD) models (e.g., to predict leakage location), a machine learning algorithm, an extrapolation model and so forth, such that the hazgas monitoring model 84 can be updated and trained over time to be smarter (e.g., more accurate prediction and better recommendations). Furthermore, the hazgas monitoring model 84 may include a diagnostics module 108, which may report current state or parameters of hazgas leakage (e.g., leakage concentration, leaking rate, volume, size, and location), report the assessment of the leakage situation (e.g., hazgas concentration, volume, size, and/or severity), issue recommendations for maintenance and repair, and/or issue or adjust an operation of one or more components of the turbine system 10. For example the diagnostic module 108 may monitor and analyze the current leakage situation (e.g., leakage concentration, rate, size, location, and/or severity), operational conditions, parameters and data from the turbine system 10, and compare the analyzed results with the historical records. The current leakage situation, operational conditions, parameters and data may also be analyzed and compared with the predictions of the hazgas monitoring model 84 and/or the expert experience. The diagnostics may be issued based on the comparison. In other embodiments, the diagnostic module 108 may also issue recommendations to adjust the operation conditions/parameters of the turbine system 10 based on comparison.

It may be appreciated that the diagnostic results issued by the diagnostic module 108 may also be fed back to the hazgas monitoring model 84 to update/train the hazgas monitoring model 84. In addition, the hazgas monitoring model 84, the diagnostics module 108, and all data included thereof may be stored in the memory 92 of the controller 82. In other embodiments, the hazgas monitoring model 84, the diagnostics module 106, and all data included thereof may be uploaded to the service platform 86 and stored in the service platform 86 (e.g., upon instructed by processor 90 of the controller 82). Authorized users may have access to the data, results/reports, the hazgas monitoring model 84, and the diagnostics module 106 through the service platform 86. Authorized users may also provide customer/user experiences and expert experiences through the service platform 86, and those information may be used to train/update the hazgas monitoring model 84. As such, the smart hazgas system 80 is integrated into digital power plant to operation optimization, and online diagnostics may be available to increase reliability and availability of the turbine system 10.

In one embodiment, the hazgas monitoring model 84 may create a hazgas index (e.g., number), which functions as a hazgas barometer to evaluate the leakage condition/situation inside the enclosure 14 (e.g., indicative of the severity of the hazgas leakage). The hazgas barometer may be updated and calibrated during the operation of the turbine system 10, and the hazgas index may be calculated based on time weighted average data during the course of the operation of the turbine system 10. The hazgas barometer may continue to record data (e.g., collected by the one or more sensors 94, 96, 98, 100, 102, and 104) and learn to improve the accuracy of the enclosure hazgas barometer to a point it can issue warning, advise, and taking appropriate actions (e.g., issue or adjust an operation of one or more components of the turbine system 10). The utilization of the hazgas barometer may start upon commissioning and calibrating the turbine system 10. For example, the hazgas barometer may correlate the measured hazgas concentration to leakage size (e.g., leakage volume in combination with hazgas concentration), and such correlation may be used to assess the severity of the leakage (e.g., level of the leakage from minor to major leaks). For example, the enclosure hazgas barometer may generate hazgas index numbers from 1 to 6, wherein hazgas index=1 may correspond to a minor leak with leakage concentration smaller than a pre-specified threshold (e.g., approximately 1% LEL), and index=6 may correspond to a major leak with leakage concentration greater than another pre-specified threshold (e.g., approximately 5% LEL or greater) such that the gas turbine 12 should be shut down and/or the fuel supply (e.g., the gaseous fuel system 56 and/or the liquid fuel system 54) should be turned off. As such, the severity of the leakage may be ranked with the hazgas index, which scales with the degree of severity. Based on the hazgas index, the diagnostics module 106 may issue diagnostic results, make recommendation for maintenance and repair of components of the turbine system 10, and/or adjust an operation of one or more components of the turbine system 10 (e.g., shutdown operation, decrease or increase enclosure ventilation fan flow rate, etc.). It may be appreciated that herein the index numbers from 1 to 6 are only provided as an example, and the index numbers may be any positive integers ranging from any arbitrary minimum to maximum values.

Figure 5:
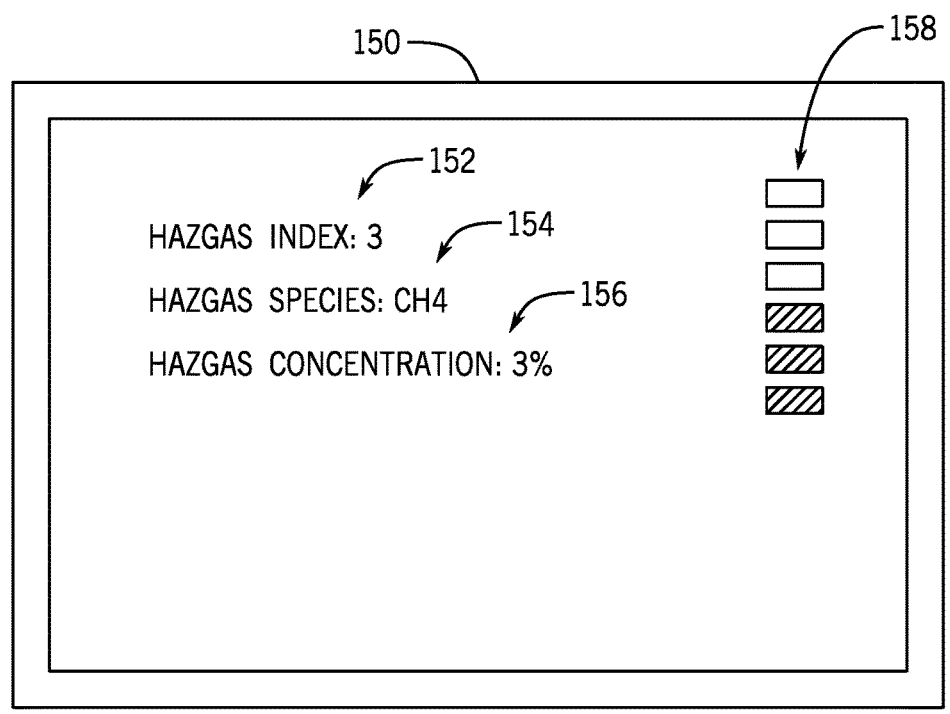
FIG. 5 is a schematic illustration of a hazgas barometer created by an active hazgas monitoring model in display, in accordance with an embodiment of the pressure disclosure.

The hazgas barometer may be displayed on a screen of any suitable remote or local devices (e.g., devices connected to the controller 82 or the service platform 86). FIG. 5 is a schematic illustration of a hazgas barometer created by the active hazgas monitoring model 84 outputted on a display screen 150. In the illustrated embodiment, the hazgas barometer may display the hazgas index number 152, hazgas species (e.g., $CH_4$) 154, hazgas concentration (e.g., % LEL) 156, or any combination thereof. The hazgas barometer may be displayed in a bar graph 158, wherein the bar graph 158 could be color coded. For example, color green may indicate nearly no hazgas leakage and the leakage condition is healthy, color yellow may indicate minor leaks, color red may indicate major leaks, and so forth.

Figure 6:
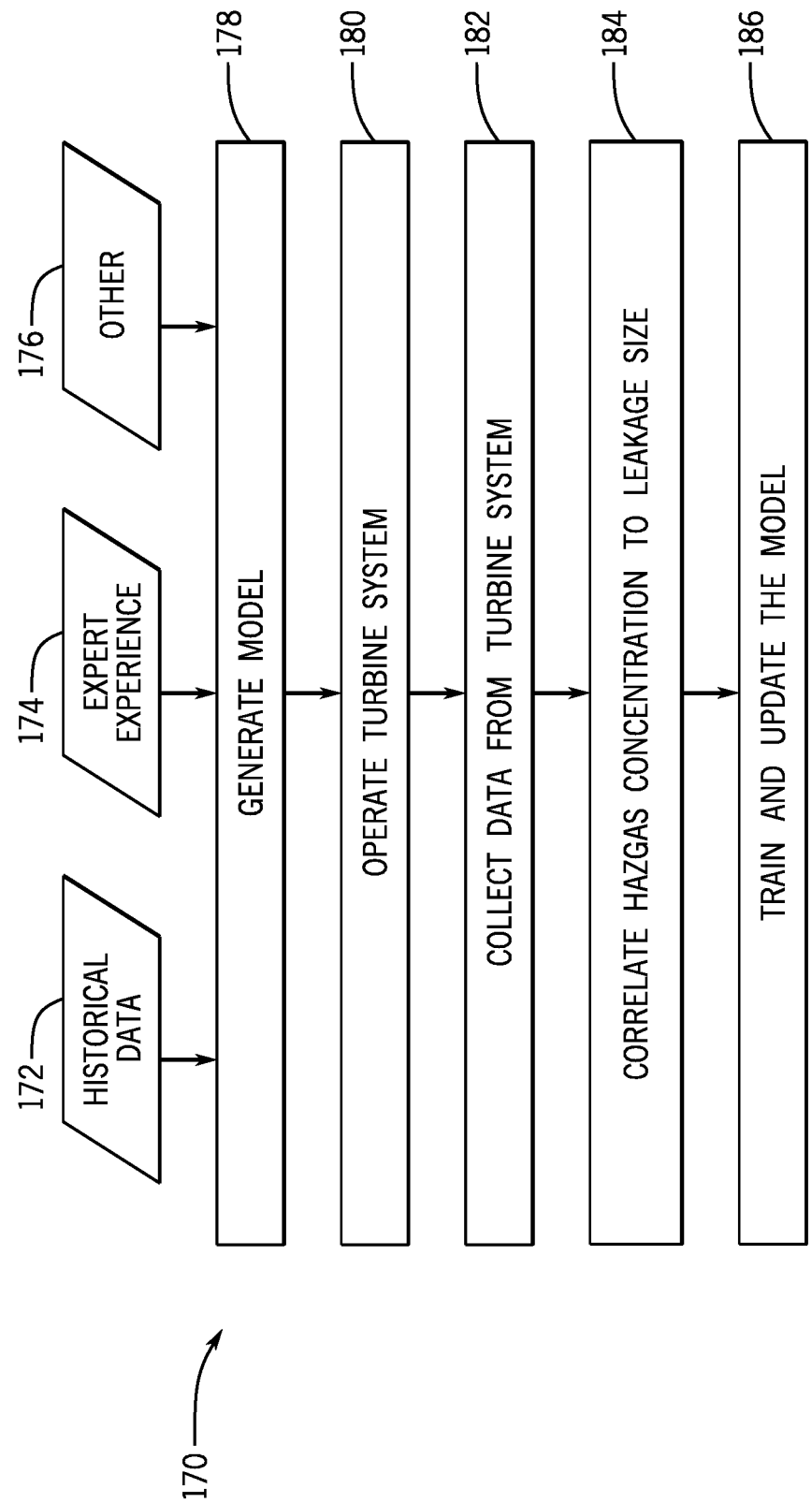
FIG. 6 is a flow chart illustrating a method for developing an active hazgas monitoring model, in accordance with an embodiment of the present disclosure.

FIG. 6 is a flow chart illustrating a method 170 for developing the hazgas monitoring model 84. One or more of the steps of the method 170 may be executed by the controller 82. The method 170 includes adapting historical data 172, adapting expert experience 174, and other 176 (e.g., any relevant information, data, and user/operator inputs) for generating model (step 178), wherein the model generated at step 178 is an initial model of the hazgas monitoring model 84 that is subjected to further training/updating. The historical data may include but not limited to lay out information of piping and equipment inside the enclosure, leakage or hazgas concentration, rate, volume, size, location, and severity, enclosure air pressure and temperature, enclosure ventilation fan flow rate and fan curves, fuel gas pressure and temperature, partial pressure of liquid fuel vapor, fuel gas flow rate, turbine power output and efficiency, compressor fuel flow rate, discharge temperature and pressure, gas turbine exhaust temperature, expert experience, or a combination thereof. The expert experience may be any user or operator inputs related to operation of the fuel system (e.g., gaseous and liquid fuel systems 56 and 54, valves, nozzles, pumps, pipes, etc.) and/or the turbine system 10. The method 170 also includes operating the turbine system 10 (step 180), and subsequent to commissioning and calibrating the turbine system 10, collecting data from the turbine system 10 (step 182). The data collected herein may be operational parameters associated with the turbine system 10 and the fuel system in particular (e.g., gaseous and liquid fuel systems 56 and 54, valves, nozzles, pumps, pipes, turbine power output and efficiency) and/or operational parameters collected via sensors (e.g., sensors 94, 96, 98, 100, 102, and 104) during operation of the gas turbine system 10. These operational parameters may include but not limited to leakage or hazgas concentration, leaking rate, volume, and size, enclosure air pressure and temperature, partial pressure of liquid fuel vapor, enclosure ventilation fan flow rate and fan curves, fuel gas pressure and temperature, partial pressure of the liquid fuel vapor, fuel gas flow rate, compressor fuel flow rate, discharge temperature and pressure, gas turbine exhaust temperature, or a combination thereof. The collected data are fed into the hazgas monitoring model 84.

The method 170 also includes correlating measured hazgas concentration to leakage size (step 184) to enable the hazgas monitoring model 84 to detect minor leaks. As set forth above, a correlation may be established between hazgas concentration and leakage size, and such correlation may be used to develop the enclosure hazgas barometer to evaluate the severity of the leaks. In one embodiment, the correlation between the hazgas concentration and leakage size may be used together with information inputted as user experiences and expert experiences to develop the enclosure hazgas barometer to evaluate the severity of the leakage. In other embodiments, a correlation may also be established between any one or more operational parameters. In addition, the hazgas monitoring model 84 may also be developed based on correlation between a variation in the one or more operational parameters. Furthermore, the hazgas monitoring model 84 may be developed based additionally on operator/user input, and fluid flow simulations utilizing a physics based model that was created in system design phase.

The method 170 further includes training and updating the model (step 186). At this stage, the hazgas monitoring model 84 is operable to predict specific operational parameters, conditions, or changes in leakage situation (e.g., inside the enclosure 14) based at least partially on data collected and correlations developed up to step 184 (e.g., steps 178 through step 184). For example, the hazgas monitoring model 84 may be able to predict fuel leakage conditions (e.g., concentration, rate, volume, size, and location) and severity of the leakage (e.g., minor to major leaks as ranked by the enclosure hazgas barometer) at a future time. The predictions made by the hazgas monitoring model 84 may be compared with the real situation/data for validation and training/updating of the hazgas monitoring model 84. In addition, the hazgas monitoring model 84 may also be trained and updated based on one or more operational parameters set forth above.

Figure 7:
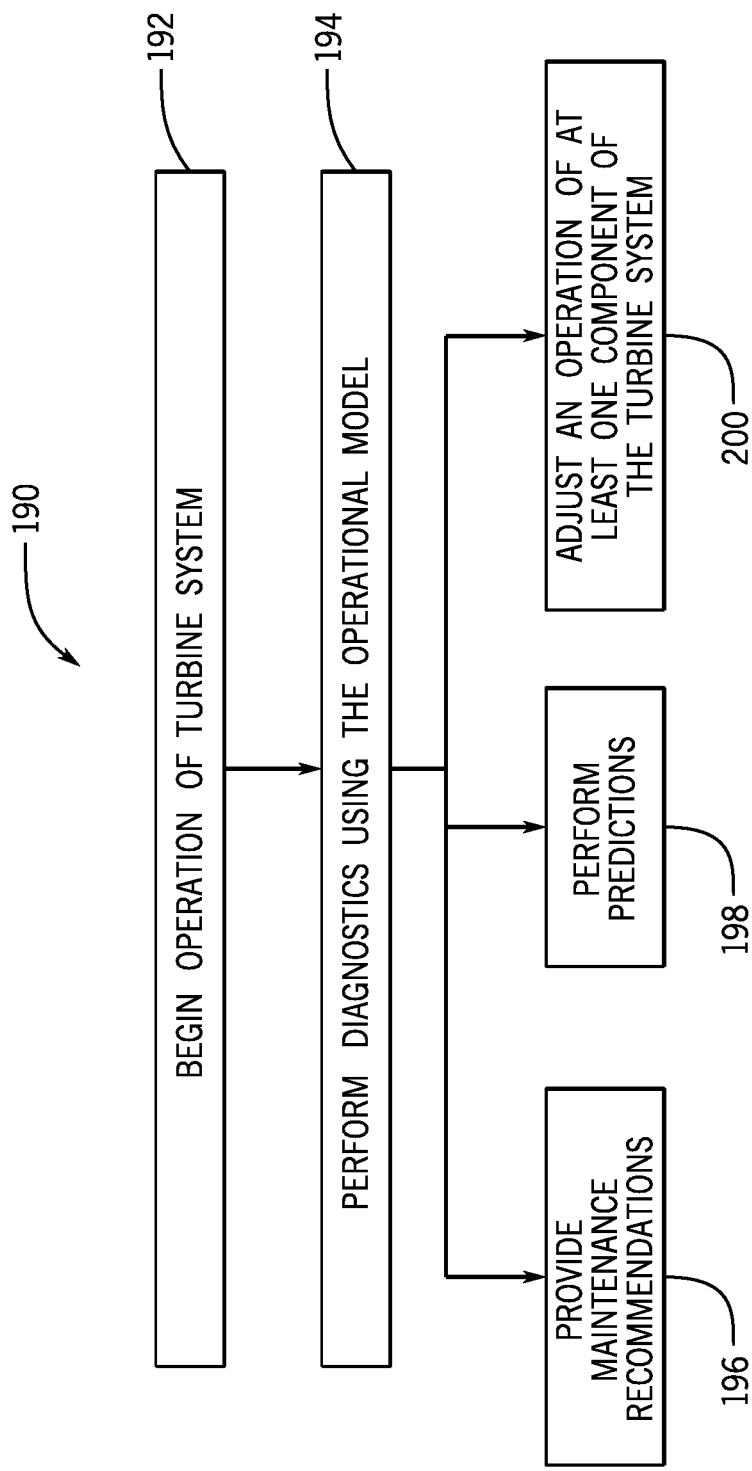
FIG. 7 is a flow chart illustrating a method for utilizing the active hazgas monitoring model, in accordance with an embodiment of the present disclosure.

FIG. 7 is a flow chart illustrating a method 190 for utilizing the hazgas monitoring model 84. One or more of the steps of the method 190 may be executed by the controller 82. The method 190 includes beginning operation of the turbine system 10 (step 192), and performing diagnostics using the hazgas monitoring model 84 (step 194). Upon beginning operation of the turbine system 10, operation conditions and operational parameters may be fed into the hazgas monitoring model 84 in an in-situ or substantially in-situ manner, enabling the diagnostics module 108 issues diagnostics (e.g., reports and updates) of the leakage condition/situation inside the enclosure 14. For example, the diagnostics module 108 may include the hazgas barometer and include correlating measured hazgas concentration to leakage size to determine if there is a leak and/or the severity of the leak. The diagnostics module 108 may determine that the hazgas leakage condition is severe (e.g., major leak as evaluated by the hazgas barometer), and the turbine system 10 should proceed to shut down or the fuel supply (e.g., the gaseous or liquid fuel systems 56 and 54) should be turned off. The diagnostics module 108 may determine that the hazard leakage condition is minor (e.g., minor leak as evaluated by the hazgas barometer), and the turbine system 10 can operate as normal.

The method 190 also includes performing predictions (step 198), providing maintenance recommendations (step 196), and adjusting an operation of at least one component of the turbine system 10 (step 200) using the hazgas monitoring model 84. Concurrent with the turbine operation, conditions and parameters are continuously fed into the hazgas monitoring model 84 to update the hazgas monitoring model 84 with the latest and concurrent conditions of the turbine system 10. Accordingly, the hazgas monitoring model 84 can predict the leakage condition/situation inside the enclosure 14, the specific parameters/conditions of the leak (e.g., concentration, rate, volume, size, location, and severity) at future times. For example, the hazgas monitoring model 84 may predict that particular component(s) of the fuel system (e.g., components of the gas turbine system 10) may experience leakage in the future (e.g., in few days, weeks, months, or years). As a further example, the hazgas monitoring model 84 may predict that the severity of the leakage inside the enclosure 14 may exceed a pre-specified level (e.g., as evaluated by the hazgas barometer) such that the turbine system 10 should be shut down, and/or the gaseous fuel system 56 and/or the liquid fuel system 54 should be turned off in the future (e.g., in few days, weeks, months, or years).

As mentioned, the hazgas monitoring model 84 may also be utilized for providing maintenance recommendations (step 196). For example, as the hazgas monitoring model 84 is communicatively coupled to the service platform 86 if it was predicted that certain components(s) inside the enclosure 14 of the gas turbine system 10 may experience minor or major leakage (e.g., as evaluated by the enclosure hazgas barometer) after some time period (e.g., in few days, weeks, months, or years, etc.), the hazgas monitoring model 84 would issue maintenance recommendations (e.g., communicated through the service platform 86 to users/operators, etc.) to fix or replace the component(s) before the occurrence of the predicted issues/problems. In addition, the hazgas monitoring model 84 may be utilized for adjusting an operation of at least one component of the turbine system 10 (step 200). For example, the hazgas monitoring model 84 may predict that a severe/major leak has occurred and provide control signals (e.g., through the service platform 86 and/or through the controller 82) to shut down the operation of the turbine system 10 and/or turn off the gaseous fuel system 56 and/or the liquid fuel system 54. The hazgas monitoring model 84 may also adjusting operation of any components of the turbine system 10. For example, the hazgas monitoring model 84 may send control signals to increase or decrease the flow rate of the gaseous or liquid fuel as to decrease or contain the size and/or severity of the leakage. For example, the hazgas monitoring model 84 may send control signals to increase or decrease the fan flow rate of the enclosure ventilation fan.

This written description uses examples to describe the present embodiments, including the best mode, and also to enable any person skilled in the art to practice the presently disclosed embodiments, including making and using any devices or systems and performing any incorporated methods. The patentable scope of the presently disclosed embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A gas monitoring system for monitoring gas leaks from a gas turbine engine disposed within a gas turbine enclosure, comprising:
a controller, comprising:
a processor;
a memory communicatively coupled to the processor, wherein the memory stores instructions which when executed by the processor perform operations comprising:
obtaining one or more operational parameters associated with a gas turbine system having the gas turbine engine from one or more sensors during operation of the gas turbine engine;
utilizing a gas monitoring model to monitor for gas leaks within the gas turbine enclosure and to generate a gas index indicative of a severity of a gas leak within the gas turbine enclosure based on the one or more operational parameters;
outputting the index; and
updating the gas leakage monitoring model during operation of the gas turbine engine based on the one or more operational parameters.

2. The gas monitoring system of claim 1, wherein the gas index comprises a numerical value indicating the severity of the gas leak.

3. The gas monitoring system of claim 1, wherein the gas index comprises a graphical indicator indicating the severity of the gas leak.

4. The gas monitoring system of claim 1, wherein the gas leakage monitoring model is configured to detect a leak of less than 1 percent of a lower explosive limit.

5. The gas monitoring system of claim 1, comprising the one or more sensors, and the one or more sensors comprise at least one acoustical wave sensor configured to detect a partial pressure of a liquid fuel vapor.

6. The gas monitoring system of claim 5, wherein the one or more operational parameters comprise the partial pressure of the liquid fuel vapor.

7. The gas monitoring system of claim 1, wherein the one or more operational parameters comprise gas concentration and leakage size.

8. The gas monitoring system of claim 7, wherein utilizing the gas leakage monitoring model to monitor for gas leaks comprises correlating the gas concentration to leakage size to determine severity of the gas leak.

9. The gas monitoring system of 1, wherein utilizing the gas leakage monitoring model to generate the gas index begins upon commissioning and calibrating the gas turbine system.

10. The gas monitoring system of 1, wherein the memory stores instructions which when executed by the processor perform operations comprising generating the gas leakage monitoring model based at least on historical data and the one or more operational parameters.

11. The gas monitoring system of claim 1, wherein the memory stores instructions which when executed by the processor perform operations comprising utilizing the gas leakage monitoring model to generate and provide a recommendation for maintenance of a component of the gas turbine system.

12. The gas monitoring system of claim 1, wherein the memory stores instructions which when executed by the processor perform operations comprising utilizing the gas leakage monitoring model to generate and to provide a control action to adjust an operation of at least one component of the turbine system.

13. A system, comprising:
a gas turbine enclosure;
a gas turbine engine disposed in the gas turbine enclosure;
one or more sensors disposed within the turbine enclosure;
a controller, comprising:
a processor;
a memory communicatively coupled to the processor, the memory storing instructions which when executed by the processor perform operations comprising:
obtaining one or more operational parameters associated with a gas turbine system having the gas turbine engine from the one or more sensors during operation of the gas turbine engine;
utilizing a gas leakage monitoring model to monitor for gas leaks within the gas turbine enclosure and to generate a gas index indicative of a severity of a gas leak within the gas turbine enclosure based on the one or more operational parameters;

outputting the index; and updating the gas leakage monitoring model during operation of the gas turbine engine based on the one or more operational parameters.

14. The system of claim 13, wherein the gas leakage monitoring model is configured to detect a leak of less than 1 percent of a lower explosive limit.

15. The system of claim 13, wherein the one or more sensors comprise at least one acoustical wave sensor configured to detect a partial pressure of a liquid fuel vapor and the one or more operational parameters comprise the partial pressure of the liquid fuel vapor.

16. The system of claim 13, wherein the one or more operational parameters comprise gas concentration and leakage size.

17. The system of claim 16, wherein utilizing the gas leakage monitoring model to monitor for gas leaks comprises correlating the gas concentration to leakage size to determine severity of the gas leak.

18. The system of claim 13, wherein the gas index comprises a numerical value indicating the severity of the gas leak or a graphical indicator indicating the severity of the gas leak.

19. A non-transitory computer-readable medium having computer executable code stored thereon, the code comprising instructions for:

obtaining one or more operational parameters associated with a gas turbine system having a gas turbine engine disposed within a gas turbine enclosure from one or more sensors during operation of the gas turbine engine;

utilizing a gas leakage monitoring model to monitor for gas leaks within the gas turbine enclosure and to generate a gas index indicative of a severity of a gas leak within the gas turbine enclosure based on the one or more operational parameters;

outputting the index; and updating the gas leakage monitoring model during operation of the gas turbine engine based on the one or more operational parameters.

* * * * *